United States Patent Office 3,268,844
Patented August 23, 1966

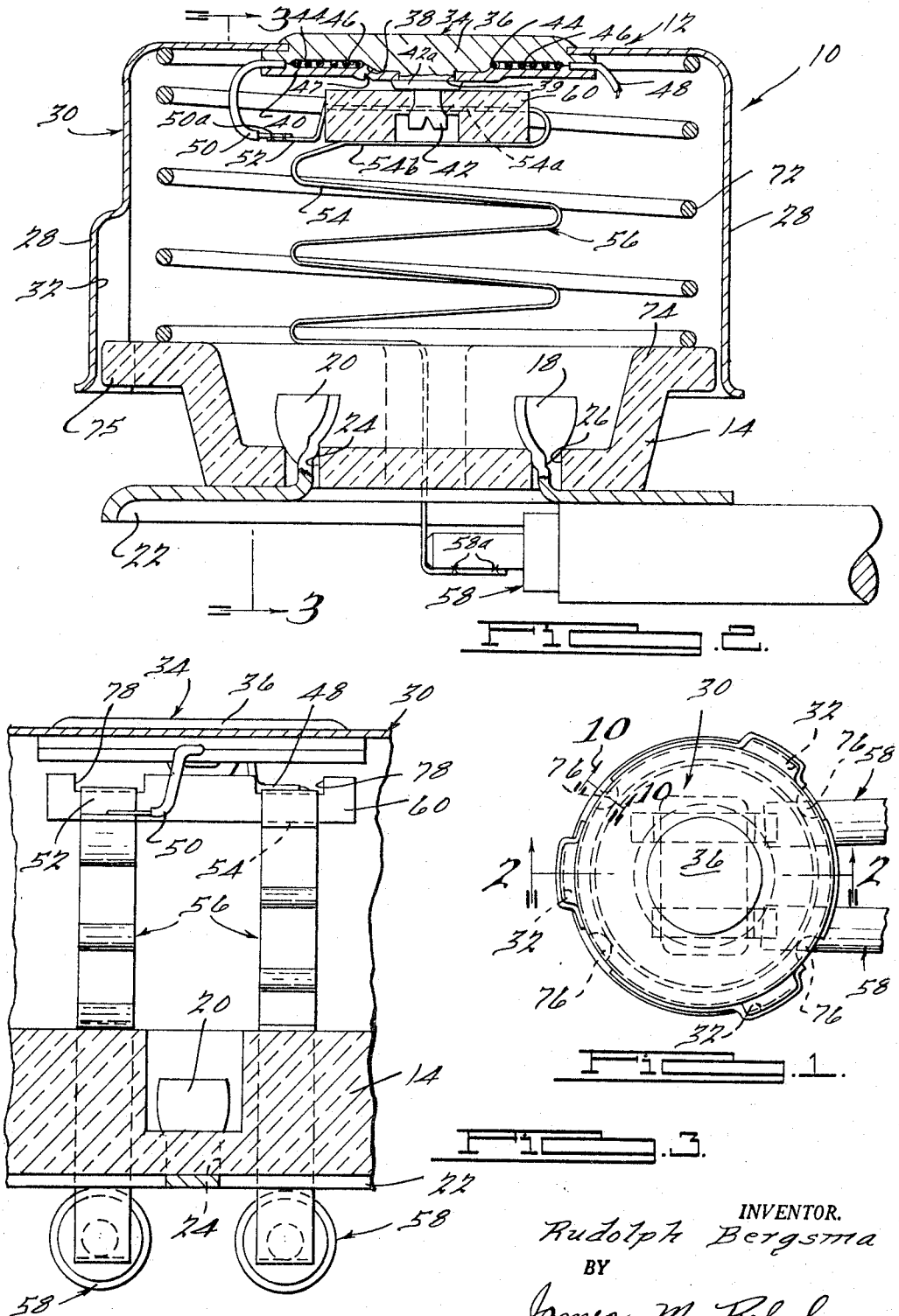

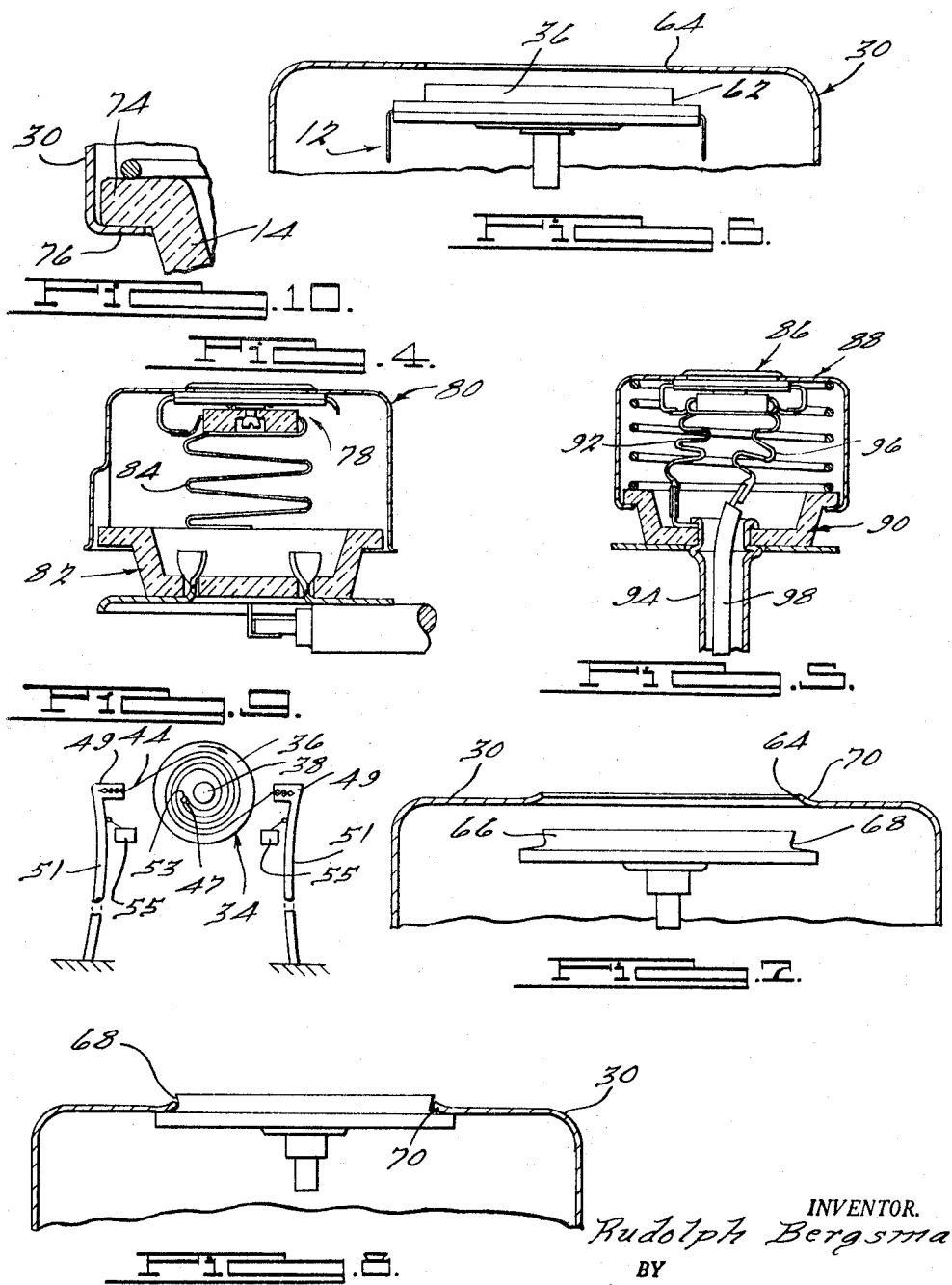

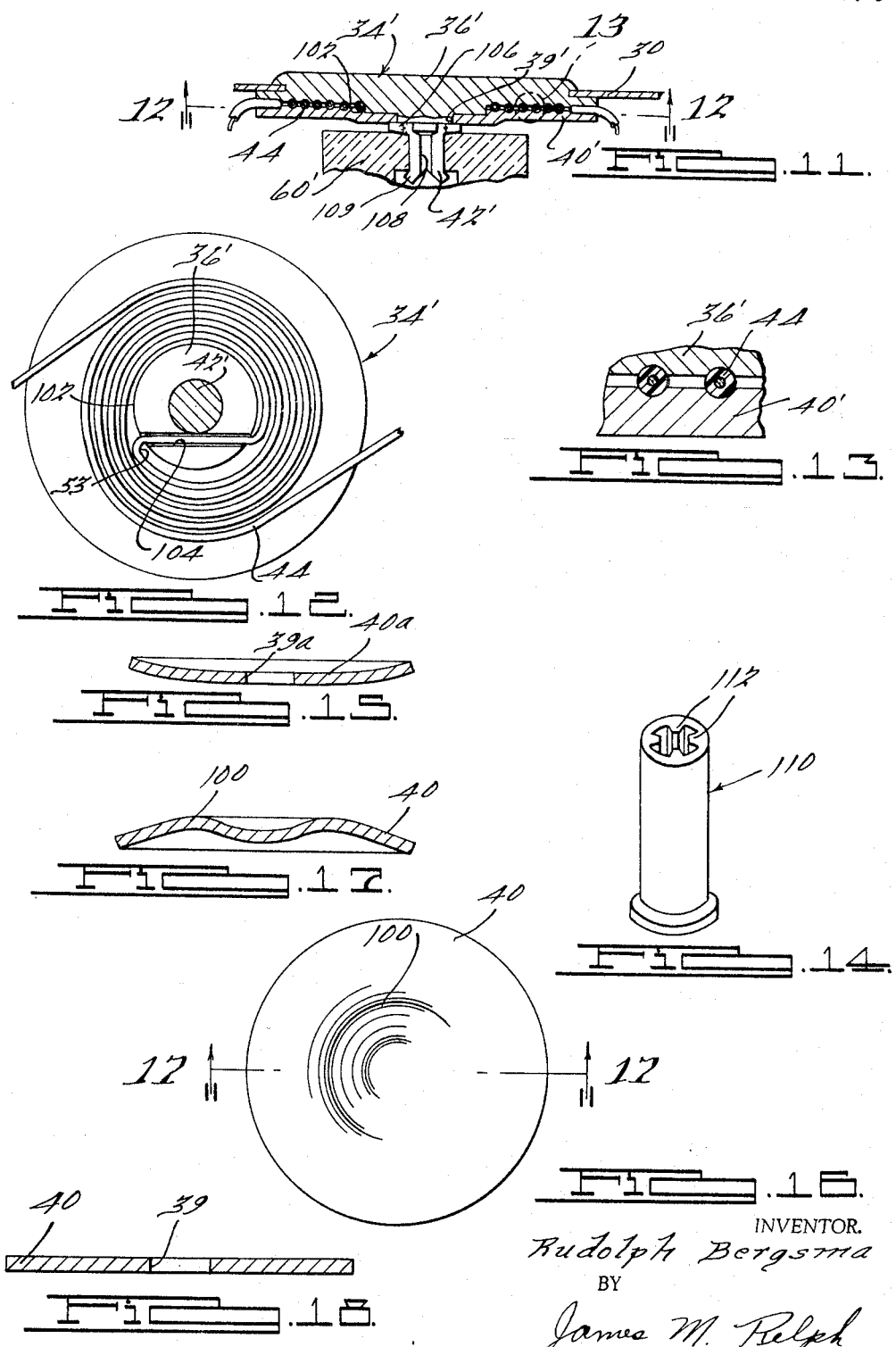

3,268,844
TEMPERATURE SENSER
Rudolph Bergsma, Ann Arbor, Mich., assignor to King-Seeley Thermos Co., Ann Arbor, Mich., a corporation of Michigan
Filed Oct. 19, 1961, Ser. No. 146,176
32 Claims. (Cl. 338—28)

This invention relates to temperature responsive elements and more particularly to an improved temperature senser adapted to be in intimate heat transfer relationship with a body receiving heat from what is commonly known in the household appliance industry as a surface heater, and to an improved method of manufacturing such sensers.

An important object of this invention is to provide an improved temperature senser comprising a base adapted to be fixed in place, a movable sensing member adapted to be directly engaged and depressed by a utensil or other device receiving heat from the associated surface heater, and resilient conductor means of serpentine form for applying a yielding biasing force tending to cause relative movement between the movable member and the fixed base.

Further objects of the present invention are to provide an improved temperature senser having a spring conductor means, which is yieldingly connected between a movable sensing member and a fixed base, and is free of work-hardening problems; to provide such a senser in which the conductor means comprises serpentine springs which are free of work-hardening and have spring-biased end portions adapted to snap onto the movable portion of the senser and other end portions connected to the base portion; to prevent high temperature destruction of electrical insulation material on the conductor portion of such temperature sensers by eliminating the need for such insulation; to prevent the shorting out of temperature sensers having such uninsulated conductors by spacing the conductors to prevent physical contact therebetween and between the conductors and other portions of the senser assembly; and to prevent such contact by providing serpentine spring conductors having a substantial width and a generally rectangular cross-section to reduce lateral deflection of the conductors as the movable sensing member moves with respect to the fixed base portion of the temperature senser.

Further objects of the invention are to provide such constructions in which, in certain forms, the serpentine springs are the sole means to bias the movable sensing member away from the fixed base; to enclose the upper portion of the improved temperature senser with a smooth surfaced protective cap means which is easily wiped clean and which prevents the entrance of food particles and the like into the interior of the temperature senser assembly which might otherwise tend to jam free relative movement between the movable sensing member and base portion of the assembly; to prevent jamming of the protective cap means on said base portion by providing an annular skirt portion on said cap means which surrounds the outer periphery of a base flange which has a small height in relation to the diameter of the base so said cap means will freely pivot on said base flange without jamming when lateral forces tilt said cap means with respect to said base; and to provide such a senser having a protective tube assembly for conducting current through the spring conductor means.

Still further objects of this invention are to improve the manufacture of temperature sensers, having a pellet portion and a protective cap portion, by winding a high temperature coefficient wire in a bifilar manner with respect to the pellet portion; to further improve the manufacture of such sensers by connecting the pellet portion on the protective cap portion of such a senser by deforming the pellet portion on the protective cap or by deforming the protective cap with respect to the pellet portion.

With the above as well as other and, in certain cases, more detailed objects in view, preferred but illustrative embodiments of the invention are shown in the accompanying drawings, throughout the several views of which corresponding reference characters are used to designate corresponding parts and in which:

FIGURE 1 is a plan view of a temperature senser constructed in accordance with the principles of the present invention;

FIG. 2 is an enlarged view in vertical central section taken along the line 2—2 of FIG. 1 looking in the direction of the arrows;

FIG. 3 is a view in vertical section taken along the line 3—3 of FIG. 2 looking in the direction of the arrows;

FIG. 4 is a view in vertical section of another embodiment of a surface heater senser in accordance with the principles of the present invention;

FIG. 5 is a view in vertical section of a further embodiment of the invention;

FIG. 6 is a view of portions of the embodiment illustrated in FIGS. 1-3 in the course of final assembly;

FIG. 7 is a further modification of the invention in the course of final assembly;

FIG. 8 is an assembled view of the modification illustrated in FIG. 7;

FIG. 9 is a diagrammatic view illustrating the bifilar winding method of the present invention;

FIG. 10 is an enlarged view in vertical section taken along the line 10—10 of FIG. 1 looking in the direction of the arrows;

FIG. 11 is a view in vertical section of the senser portion of a still further embodiment of the invention;

FIG. 12 is a view in horizontal section taken along the line 12—12 of FIG. 11;

FIG. 13 is an enlarged view of detail 13 in FIG. 11;

FIG. 14 is a view in perspective of a tubular punch used in the assembly of the embodiment of FIG. 11;

FIG. 15 is an enlarged view in vertical section of a backing plate portion of the senser assembly which is dished upwardly at its outer peripheral edges;

FIG. 16 is a plan view of a blank backing plate deformed to compensate for the dishing effect shown in FIG. 15;

FIG. 17 is a view in vertical section taken along the line 17—17 of FIG. 16; and FIG. 18 is a view in vertical section of the blank backing plate of FIGS. 16 and 17 following fabrication.

Referring now to the drawings, FIGS. 1-3 illustrate one embodiment of a temperature senser assembly 10 constructed in accordance with the present invention. The senser 10 is adapted to be concentrically located with respect to a surface heater (not shown) such as a gas burner or an electrical heating element which is in heat transfer relationship with an object such as a cooking utensil which is supported on or adjacent the surface heater. As an illustrative example, the cooking utensil may rest upon an improved senser portion 12 of the senser assembly 10 so that as the underside of the cooking utensil approaches a preselected temperature the improved surface heater senser assembly 10 will indicate the attainment of the preselected temperature by lighting a light or energizing a buzzer, or may, by way of further example, control the heat output of the surface heater by actuating a solenoid inlet valve to a gas burner or open or close a relay to energize or deenergize an electrical heating element.

A fixed base 14, preferably consisting of a ceramic electrical insulating material such as steatite or the like, stationarily supports the senser assembly 10 with respect to a surface heater as, for example, on the spider-bracket assembly illustrated in application No. 860,280, filed December 17, 1959, by Emil E. Sivacek, now Patent No. 3,153,139 or on a rigid conduit-hanger assembly as illustrated in application No. 169,066, filed January 26, 1962, by Gary F. Woodward now Patent No. 3,100,995. In the illustrative embodiment of FIGS. 1–3, a support plate 22 having tabs 18, 20, extending through apertures 24, 26 in the base 14 support the surface heater assembly 10 concentrically with respect to a surface heater as disclosed in the aforesaid Woodward application.

The senser portion 12 includes a pellet 34, of a good thermally conductive material such as aluminum, brass or the like, having an upper plate or disc portion 36. The plate 36 has a tapered annular shoulder 38, which may be and is representatively shown to be integral with the plate 36. An arbor 42 which projects from the plate 36 extends through a central aperture 39 in a backing plate portion 40 which is held in axial abutment with the plate 36 by a shoulder 42a on the arbor 42. A bifilar wire 44 is carried between the plate 36 and the backing plate 40 in an annular groove 46 defined thereby. Terminal ends 48, 50 of the wire 44 extend outwardly from between the plate 36 and the backing plate 40 at peripherally spaced points.

The upper surface of the plate 36 is adapted to be in intimate heat transfer contact with the bottom surface of a cooking utensil which is located in heat transfer relationship with the surface heater as mentioned above. The surface area of the plate 36 is relatively large in proportion to its mass and thickness, which makes it very sensitive to utensil temperature change and comparatively insensitive to side radiation from the surface heater (not shown) which is preferably located radially outwardly from the pellet 34.

The outer peripheral edge of the plate 36 is connected to a movable member or skirted cap 30 which has a low coefficient of thermal conduction, and in one constructed arrangement was formed of stainless steel having a thin cross-section to minimize radial transfer of heat from the surface heater directly to the senser portion 12 and to minimize the conduction to the senser of heat radiantly transferred to the cap 30 from the surface heater. The skirted cap 30 has a smooth upper surface which encloses the top portion of the senser assembly to prevent the entrance of food particles and the like into its interior which might otherwise tend to jam the free relative movement between the senser portion 12 and base 14. Such construction also enables the senser assembly to be quickly cleaned by wiping off the smooth upper surface of the cap 30.

In order to bias the cap 30 upwardly so as to maintain the pellet 34 in intimate engagement with the cooking utensil, a coil spring 72 is interposed between the cap 30 and the base 14. The upper end of the coil spring 72 bears against the interior surface of the top of the cap 30 and the lower end of the coil spring 72 rests on an upper flange 74 of the base 14. A skirt 28 on the movable member or skirted cap 30 has a plurality of circumferentially spaced grooves 32 which receive a corresponding plurality of circumferentially spaced ears 75 on the base 14 to prevent relative rotation therebetween and provide a limit to depressing movement of the cap 30 and the pellet 34 with respect to the base support 14.

In order to prevent jamming of the cap 30 on the base 14 which might otherwise occur where lateral forces tilt the cap 30 relative thereto, the height of the upper flange 74 is made small relative to the diameter of the base 14. Such structure enables the cap 30 to tilt relative to the base 14 without jamming since the interior surface of the grooves 32 engages the ears 75 on the flange 74 to freely pivot the cap 30 on the base 14. Such tilting might otherwise cause the cap of such air assembly to be jammed in a depressed position. In cases in which the assembly is hot it is difficult to release the cap from such jammed positions.

The cap 30 also has a plurality of circumferentially spaced tab portions 76, best illustratel in FIGS. 1 and 10, at the base thereof which engages the underside of the flange 74 on the base 14. The tab portions 76 hold the cap 30 on the base portion 14 against the biasing action of the spring 72 and also allow the cap 30 to pivot on the base 14 without jamming when the senser portion 12 is fully extended.

The sensing wire 44 of the senser portion 12 is electrically connected to a suitable temperature controlling system by spaced electrically conductive serpentine or ripple springs 56 made up of a plurality of reversely bent portions 54 and a U-shaped upper end portion 52 which is connected to the respective ends 48 and 50 of the sensing wire 46 as by welding at points 50a. The opposite ends of the serpentine springs 56 extend through suitable apertures on the base portion 14 to connect as by welding at points 58a to spaced rigid conductors 58 which extend outwardly to a terminal portion (not shown) adapted to removably connect to the temperature controlling system in a low temperature ambient zone. In accordance with concepts set forth in application No. 860,280, filed December 17, 1959, by Emil E. Sivacek, the sensing wire 44 is, therefore, connected to the temperature controlling system through a continuous conductor path which prevents any noticeable high temperature corrosion of the conductive path and thereby prevents resistance variations which otherwise would affect the operation of the improved temperature senser assembly.

A spring support block 60 is concentrically disposed on the arbor 42 and staked thereon by deforming the end of the arbor 42 thereagainst to provide a positive locating and mounting means for the upper end portions 52 of the serpentine conductor springs 56 so that the senser portion 12 is not strained by the spring conductors 56. The upper legs 54a of the U-shaped upper end portion 52 are received in spaced grooves 78 in the upper surface of the support block 60, and spring legs 54b of the upper end portion 52 underlie the lower surface of the support 60. The ends 52 are snapped into place by spreading the legs 54a, 54b and, when in place, these legs resiliently grip the support 60.

All of the forces from spring conductors 56, therefore, are carried by the support 60. This prevents bending of the ends 48, 50 of the sensing wire 46 and at the junctures 50a between the ends 48, 50 and the ends 52 of the spring conductors 56. Such bending is undesirable since it would strain the ends 48, 50 and thereby change the resistance of the senser portion 12. Likewise, such bending could break the connections between the ends 48, 50 and the spring conductors 56. In either event, the operation of the senser assembly would be adversely affected.

The spring support block 60 is spaced from the pellet 34 of the senser portion 12 to provide an insulating air gap therebetween that prevents the support block 60 which has a greater heat storage capacity than the pellet portion 34 of the assembly from affecting its heat storage characteristics. Thus, the pellet portion 34 quickly responds to the temperature of a utensil which is in intimate heat transfer contact therewith. The support block 60 shields the pellet 34 from the lower portions of the senser assembly and thereby prevents radiant heat transfer from this region to the pellet 34.

Previous temperature sensers of this type had conductors insulated by material which would break down over a period of use when subjected to high temperature ambient conditions. Such conductors would often contact one another or adjacent portions of the senser assembly and when the insulation broke down, the assembly could be shorted out and become inoperative. The serpentine spring conductors 56 of the present invention are, therefore, uninsulated and of a high nickel alloy such as "D" nickel, an alloy including about 95% nickel and 4.5% manganese. Furthermore, in the illustrated embodiment, the bent portions 54 have a generally flat rectangular cross section of substantial width to prevent lateral deflection or buckling of the conductors 56 as the senser portion 12 moves relative to the base 14. It will, of course, be understood that bent portions 54 having circular, elliptical or other cross sections would be suitable for purposes of the invention if formed so as to inhibit lateral deflection or buckling. Such a configuration prevents the uninsulated conductors 56 which are spaced apart by the spring support 60 from contacting one another or adjacent portions of the senser assembly during the relative movement of the senser portion 12 with respect to the base portion 14. Thus, the improved senser assembly will not short out even though its conductor portions are uninsulated.

The improved uninsulated serpentine spring conductors 56 are also highly flexible and permit yielding relative movement between the senser portion 12, cap 30 and the base 14. It has been found that the serpentine spring construction and the shielding of the spring conductors 56 from high temperatures materially reduces work-hardening of conductors connected between a movable senser portion and a fixed base portion in surface heater assemblies of the aforedescribed type.

In a generic sense, the serpentine spring conductors 56 may be initially compressibly mounted between the fixed base 14 and the movable senser portion 12 or can be initially unstressed or in tension between the movable senser portion 12 and the base 14. It is preferred, however, that the stress in the serpentine spring 56, whether tension or compression, does not reverse in use. In one constructed embodiment illustrated in FIGS. 1–3, the serpentine springs 56 were continuously under compression through all positions of the movable senser portion 12 with respect to the base 14 and so supplement the force of the spring 56 in urging the senser portion 12 away from the base 14 to assure the engagement of the plate 36 of the pellet 34 with a cooking utensil or the like.

Another embodiment of the improved temperature senser, illustrated in FIGS. 11–14, is, except as noted below, identical in structure and mode of assembly, to the embodiment of FIGS. 1–3. In FIGS. 11–14 the pellet 34' has a vertical annular shoulder 102 about which the sensing wire is wound between the upper plate portion 36' and the backing plate 40'. A chordal groove 104 in the bottom surface of the upper plate 36' and tangent to the arbor 42', receives the mid-portion of the sensing wire 44 which is held therein by the backing plate 40' which is in axial abutment with the bottom surface of the upper plate 36'. A plurality of circumferentially spaced tabs 106 extend radially outwardly at the upper end of a like number of elongated grooves 108 in the arbor 42', to hold the backing plate 40' against the upper plate 36'. The undersurfaces of the plurality of tabs 109 engage the underside of the spring support block 60' and secure it and pellet 34' together.

Reverting to the structure of FIGS. 1–3, the improved method of manufacturing the improved senser portion or pellet 34 comprises the steps of placing the backing plate 40 on the arbor 42 in axial abutment with the plate 36 adjacent the shoulder 38. Radially outwardly of the shoulder 38 the plate 36 is spaced from the backing plate a distance equal to the diameter of the sensing wire 44.

The backing plate 40 must be absolutely flat to maintain the spacing between it and the plate 36 equal to the diameter of the sensing wire 44 so that the sensing wire 44 is positively guided into the pellet without forming double layers of wire and the like. The backing plate 40 is preferably formed by a stamping operation or the like which conjointly forms the central aperture 39 in the backing plate through which the arbor 42 extends. When the sheet of material forming the blank backing plates is initially flat the finished backing plates are slightly dished. A magnified example of such dishing is illustrated in FIG. 15 where the outer peripheral edges of a backing plate 40a are turned upwardly so that the backing plate is located too far from the plate 36 adjacent the arbor portion of the assembly and too close adjacent the peripheral edge of the plate 36. The material from which the backing plate is stamped, therefore, has an annular dent 100, as illustrated in FIGS. 16 and 17, concentric with the location of the central aperture 39 of the finished backing plate 40. The dent 100 turns the peripheral edges of the blank backing plate downwardly to counteract the tendency for the edges to dish upwardly during the stamping operation and causes the finished backing plate 40 to be absolutely flat as illustrated in FIG. 18.

The arbor 42 is then spun to form the shoulder 42a which holds the backing plate 40 against the plate 36. Thereafter, a strand of the sensing wire is placed in the annular groove 46 defined by the plate 36 and the backing plate 40 and the backing plate is deformed as at 47 (FIG. 9) for fixing the wire 44 with respect to the pellet 34. In the alternative embodiment illustrated in FIGS. 11–14, the sensing wire 44 is fixed with respect to the pellet 34' prior to winding by placing the center portion of the sensing wire 44 in the chordal groove 104 in the bottom surface of the upper plate 36'. The arbbor 42' is then inserted through the aperture 39' in the backing plate 40' until the upper surface of the backing plate 40' engages the bottom surface of the upper plate 36' to secure the sensing wire 44 in the upper plate 36'. Then the backing plate 40' is fixed in axial abutment with the upper plate 36' by inserting the arbor 42' in a tubular punch 110 illustrated in FIG. 14, which has an inner diameter equal to the outer diameter of the arbor 42' and a plurality of circumferentially spaced radially inwardly extending cutting edges 112. The punch 110 is driven against the arbor 42' and the edges 112 cut the grooves 108 in the arbor 42' to form the tab portions 106 which securely hold the plate 40' in place. The bottom surface of each of the tab portions 106 form a backing surface for the conductor support plate 60' which is firmly secured on the arbor 42' by bending the tabs 109 of the arbor 42' over the underside of plate 60'.

Continuing with the assembly of structure of FIGS. 1–3 (the same procedure also being followed in producing the structure of FIGS. 11–14), the pellet and wire are then placed in a fixture shown diagrammatically in FIG. 9, in which figure the backing plate 40 is removed so as to reveal the wire 44. The fixture has means (not shown) for rotating the pellet 34 to wind the wire thereon. During rotation of the pellet the wire is continually tensioned to a degree which assures uniform winding but which will not deform the wire. The tension may be maintained in any conventional manner, for example, in FIG. 9 the terminal ends 48 and 50 of the sensing wire 44 are held by suitable clamps 49 on cantilevered spring arms 51 which are initially deflected a substantial distance from the pellet 34 to tension the wire 44 held therebetween. The pellet 34 is then rotated about an axis defined by the longitudinal axis of the arbor 42 causing a bight 53 to form in the wire 44 adjacent the point 47 (or the chordal groove 102 in FIGS. 11–14). Rotation of the pellet 34 continues to bifilarly wind the wire 44 between the plate 36 and the backing plate 40. As the wire 44 winds on the pellet 34 the spring arms 51 are pulled inwardly to a point at which they close limit switches 55 to energize means indicating that a preselected length of wire has been wound between the plate 36 and the backing plate 40. At this point the terminal ends 48, 50 of the wire 44 extend outwardly from between the plate 36 and the backing plate 40 at peripherally spaced points.

In the bifilar winding technique the sensing wire 44 is wound on the pellet 34 in half the revolutions required for unifilar winding. Furthermore, the winding fixture can be sized for one-half the lead length of unifilar winding where the winding starts at one end of the wire length. Thus, the fixture can be of a simpler, more economical construction. Furthermore, the bifilar technique eliminates the need for threading one end of the sensing wire through the backing plate as when the wire is wound from one end of a length of wire in the unifilar technique. The elimination of the threading process and the fewer number of revolutions required in the bifilar technique substantially reduces the time for assembling a single temperature sensor assembly and thereby materially reduces unit costs.

The next step in manufacturing the senser pellet is to effectively seal the sensing wire 44 between the plate 36 and the backing plate 40, establishing in the process an intimate heat transfer relationship between these plates and the senser wire 44 as illustrated in FIG. 13. This is accomplished by placing the pellet 34 in a press adapted to provide forces of substantial magnitude pressing plates 36, 40 together. Desirably, but not imperatively, this compressing action is of sufficient magnitude to move portions of the adjacent surfaces of the plates into engagement with one another. For example, in the embodiment of FIGS. 1–3, the backing plate 40 follows the shoulder 38 on plate 36 and the outer peripheral portions of plates 36 and 40 are pressed into engagement. The press is provided with suitable relief at the arbor 42 and the points at which the wire terminals 48, 50 extend outwardly of the pellet 34. It has been found that if plates 36, 40 are formed of proper materials, the wire 44 may be physically embedded in one or both of the adjacent surfaces and sealed at the periphery of pellet 34 in a manner best described in Patent No. 2,980,875 issued April 18, 1961, to Emil E. Sivacek, which is herein incorporated by reference.

The assembly of the senser portion 12 is completed by concentrically disposing the support 60 on the arbor 42 and deforming the end of the arbor 42 to stake the support firmly thereon. The upper end portions 52 of the serpentine spring conductors 56 are snapped in the grooves 78 formed in the support 60 and the end portions 48, 50 of the sensing wire 46 are connected to the upper end portions 52 of the serpentine spring conductors 56 by suitable means such as welding.

In accordance with one improved method for assembling the improved temperature portion 12 with the skirted cap 30, the upper plate 36 of the pellet 34 is provided with a vertical peripheral edge 62 illustrated in FIG. 6 which freely fits through an aperture 64 in the top of the cap 30. Once the aperture 64 of the cap 30 is concentrically disposed about the plate 36 the assembly is preferably rotated relative to a suitable tool to spin the vertical edge portion 62 of the plate 36 into engagement with adjacent edges on the cap portion 30 to firmly secure the cap 30 against rotation with respect to the senser portion 12.

An alternative arrangement for assembling the senser portion 12 with respect to the cap 30 is illustrated in FIGS. 7 and 8. In this form a plate 66 on a pellet similar to that illustrated in the first embodiment has a reentrant edge portion 68 which is adapted to snap through the aperture 64 formed in the cap portion 30. In this case the aperture 64 is defined by an upwardly turned circumferential edge portion 70 which yieldingly engages the reentrant edge portion 68 to prevent rotation or axial movement of the pellet portion of the improved surface heater senser with respect to the cap 30. In assembling the senser portion 12 the aperture 64 is enlarged as the edge portion 70 yields against the insertion of the pellet into the aperture 64. Thus the reentrant edge portion 68 passes therethrough. The edge portion 70 then snaps against the reentrant edge to reduce the size of aperture 64 and firmly engage the pellet 34.

Once the pellet 34 is connected to the cap 30 the serpentine spring conductors 56 are connected to the conductors 58 and the tab portions 76 on the cap 30 are bent into engagement with the underside of the upper flange 74 of the base 14 to complete the improved senser assembly 10.

FIG. 4 illustrates an alternative arrangement having a senser portion 78 which connects to a movable cap portion 80 which yieldingly connects to a base portion 82. The details of this embodiment of the invention are counterparts of the details in the embodiment of the invention illustrated in FIGS. 1–3, except that the ripple spring conductors 84 of this embodiment are of a heavier gage material than the conductors 56. It has been found that the coil spring 72 and the lighter gage conductors 56 of the embodiment of FIGS. 1–3 can be replaced by the heavier gage ripple spring conductors 84 which will maintain the pellet portion of the senser 78 in intimate heat transfer contact with the body whose temperature is to be sensed.

A still further embodiment of the invention illustrated in FIG. 5 includes a senser portion 86 carried by a cap portion 88 movably mounted on a base 90. This embodiment of the invention is similar to the other embodiments except that one ripple spring conductor 92 electrically connects to a tubular conductor 94. The second ripple spring 96 connects to an electrical conductor 98 extending through and electrically insulated from the tubular conductor 94.

It will be understood that the specific constructions and methods of manufacture of the improved temperature senser assemblies which are herein disclosed and described are presented for purposes of explanation and illustration and are not intended to indicate limits of the invention, the scope of which is defined by the following claims.

What is claimed is:

1. A temperature sensing device comprising temperature sensing means adapted to be in intimate heat transfer relationship with a heated object, a base, and a pair of spring electrical conductor means formed from uninsulated ribbon-like material having reversely directed linearly extending rectangular serpentine portions with one end portion electrically connected to said temperature sensing means and the opposite end portion fixed to said base to yieldingly bias relative movement between said temperature sensing means and said base, said pair of conductor means being mounted in parallel side by side relationship.

2. A temperature sensing device comprising a pellet having a plate portion of good heat transfer material adapted to be disposed in heat transfer relationship with a heated object and a backing plate spaced therefrom, bifilar wire having a high temperature coefficient of resistance sandwiched between said plate portion and said backing plate, and said bifilar wire having a bight portion located adjacent the center of said pellet and end portions extending outwardly between said plate portions and said backing plate at oppositely located peripheral positions.

3. A temperature sensing device comprising temperature sensing means adapted to be in intimate heat transfer relationship with a heated object, cap means having an aperture therein, said temperature sensing means being secured to said cap means adjacent said aperture and having a peripheral edge overlying the top of said cap means adjacent said aperture to fix said temperature sensing means inside said cap means for thermally shielding said temperature sensing means from the exterior, a base spaced from said temperature sensing means within said cap means, and spring means between said base and said cap means for yieldingly biasing relative movement between said cap means and said base.

4. A temperature sensing device comprising temperature sensing means adapted to be in intimate heat transfer relationship with a heated object, support means on said sensing means, a base, flat ribbon-like rectangular spring conductor means having reversely directed serpentine portions and a spring-biased end portion snapped on said support means, and the opposite end portion of said spring conductor means connected to said base for yieldingly biasing relative movement between said sensing means and said base.

5. A temperature sensing device comprising temperature sensing means adapted to be in intimate heat transfer relationship with a heated object, a base, electrical ribbon-like rectangular spring conductor means having reversely directed serpentine portions extending linearly in zig-zag fashion and terminating in substantially flat rectangular end portions with one end portion forming a terminal connecting to said sensing means and the opposite end portion forming a terminal on said base, and a compression spring between said base and said sensing means and biasing said sensing means against said heated object.

6. A temperature sensing device comprising temperature sensing means adapted to be in intimate heat transfer relationship with a heated object, a base, electrical ribbon-like rectangular spring conductor means having reversely directed linearly extending serpentine portions of rectangular cross sectional configuration with one end portion electrically connecting to said sensing means and the other end portion of said spring conductor means connecting to said base, said spring conductor means having a spring force biasing said sensing means into intimate heat transfer contact with said heated object, and a compression spring between said base and said sensing means and supplementing the spring action of said spring conductor means to concurrently bias said sensing means with respect to said heated object.

7. A temperature sensing device comprising temperature sensing means adapted to be in intimate heat transfer relationship with a heated object, a base, support means on said sensing means, electrical ribbon-like rectangular spring conductor means having reversely directed linearly extending serpentine portions and a spring biased end portion snapping on said support means, the opposite end of said spring conductor means connecting to said base portion, said spring conductor means having a spring force biasing said sensing means into intimate heat transfer contact with said heated object, and a compression spring between said base portion and sensing means and supplementing the spring action of said spring conductor means to concurrently bias said sensing means with respect to said heated object.

8. A temperature sensing device comprising a pellet having a plate portion adapted to be supported in heat transfer relationship with a heated object and a backing plate spaced therefrom, a bifilar wire having a high temperature coefficient of resistance sandwiched between said plate portion and said backing plate, said bifilar wire having a bight portion located adjacent the center of said pellet, a base, electrical ribbon-like rectangular spring conductor means having reversely directed serpentine portions with one end portion electrically connecting to said bifilar wire, and the opposite end portion connecting to said base for yieldingly biasing relative movement between said pellet and said base.

9. A temperature sensing device comprising a pellet having a plate portion adapted to be supported in heat transfer relationship with a heated object and a backing plate spaced therefrom, a bifilar wire having a high temperature coefficient sandwiched between said plate portion and said backing plate, said bifilar wire having a bight portion located adjacent the center of said pellet and a pair of outwardly spaced ends extending therefrom, a base, support means on said pellet, a pair of electrical ribbon-like rectangular spring conductor means each having reversely directed serpentine portions and a spring-biased end portion snapped on said support means, electrical connection means connecting said end portion of each of said pair of conductor means to one of said ends of said bifilar wire and the opposite end of said spring conductor means connecting to said base portion for yieldingly biasing relative movement between said pellet and said base.

10. A temperature sensing device comprising temperature sensing means adapted to be in intimate heat transfer relationship with a heated object, a base, and a pair of electrical ribbon-like rectangular spring conductor means having reversely directed uninsulated serpentine portions formed to resist buckling with one end portion electrically connected to said temperature sensing means and the opposite end portion fixed to said base to yieldingly bias relative movement between said temperature sensing means and said base, said pair of conductor means being mounted in parallel side by side relationship.

11. A temperature sensing device comprising a pellet having a plate portion adapted to be supported in heat transfer relationship with a heated object and a backing plate spaced therefrom, and bifilar wire having a high temperature coefficient of resistance sandwiched between said plate portion and said backing plate, said bifilar wire being concentrically wound about a central axis and having radially outwardly spaced end portions directed outwardly from between said plate portion and said backing plate at peripherally spaced points.

12. A temperature sensing device comprising temperature sensing means including a sensing wire and an upper heat conducting plate adapted to be in intimate heat transfer relationship with a heated object, cap means having an aperture formed in an upper surface therein, said heat conducting plate of said temperature sensing means being secured to said cap means adjacent said aperture and having a peripheral edge overlying the top of said cap means adjacent said aperture and having a thickness to fix and locate said sensing wire of said temperature sensing means inside said cap means for thermally shielding said sensing wire of said temperature sensing means from the exterior, said cap means having a low coefficient of thermal conduction to minimize heat transfer between said cap means and said temperature sensing means, a base spaced from said temperature sensing means within said cap means, and spring means between said base and said cap means for yieldingly biasing relative movement between said cap means and said base.

13. A temperature sensing device comprising a temperature sensing means having a sensing wire and an upper heat conducting plate supported in intimate heat transfer relationship with a heated object, a base, support means spaced from said temperature sensing means below said upper heat conducting plate and said sensing wire, said support means thermally shielding said temperature sensing means, spring conductor means having reversely directed serpentine portions and a spring-biased end portion snapped on said support means, electrical connecting means connecting said spring conductor means to said temperature sensing means, and the opposite end of said spring conductor means connecting to said base portion for yieldingly biasing relative movement between said sensing means and said base.

14. A temperature sensing device for use with a surface heater of a stove or the like to sense temperature of a cooking utensil or the like supported on and heated by said surface heater by surface engagement with the utensil comprising: a temperature sensing pellet having an enclosed sensing wire with a pair of outwardly extending wire ends and an upper surface through which heat is transferred from a cooking utensil to said sensing wire, said upper surface providing the primary heat transfer source for said sensing wire; terminal support means mounted beneath said pellet and being supportingly connected thereto; a pair of ribbon-like rectangular electrical conductor means mounted on said support means and being electrically connected to said wire ends and extending downwardly therefrom for connection to a remotely located control device; electrical connecting means connecting said sensing wire to said electrical conductor means; movable housing means surrounding said pellet, except for said upper surface, and surrounding said electrical conductor means and surrounding said electrical connecting means; holding means fixedly mounting said pellet relative to said housing means with said upper surface permanently located in a plane above the uppermost surface of said housing means and forming a continuous closed connection between said pellet and said housing means; base means movably supporting said housing means; and spring means mounted between said base means and said housing means and exerting a force on said housing means tending to move said pellet relative to a surface heater into surface engagement with the utensil.

15. The invention as defined in claim 14 and wherein said terminal support means comprises a block member having a relatively large surface area extending substantially parallel beneath said pellet in spaced relationship relative thereto to define a substantial air gap therebetween, said block member having a relatively great heat storage capacity for thermally shielding said pellet.

16. The invention as defined in claim 14 and wherein said sensing pellet comprises upper and lower plate means, and said sensing wire comprises a bifilar winding located therebetween.

17. The invention as defined in claim 14 and wherein said sensing wire being located within said housing means completely below the upper surface of said housing means.

18. The invention as defined in claim 14 and wherein said sensing pellet comprises upper and lower plate means, the ends of said sensing wire extend radially outwardly beyond the edges of said plate means, downwardly from beyond the edges of said plate means, and radially inwardly beneath said pellet for connection to said electrical connecting means.

19. The invention as defined in claim 15 and wherein said electrical connecting means comprises a spring clip portion integrally formed on the end of said electrical conductor means and resiliently engaged with and held on said support block member.

20. The invention as defined in claim 19 and said spring clip portion having a U-shaped configuration with parallel leg portions, one of said leg portions extending along an upper surface of said support block member, and the other of said leg portions extending along a lower surface of said support block member, the distance between said upper surface and said lower surface of said support block member being greater than the distance between said leg portions to provide a snap-on type mounting.

21. The invention as defined in claim 14 and wherein said base means comprises radially outwardly extending flange means, portions of said flange means of limited circumferential length extending further radially outwardly: said housing means comprises a skirt portion extending downwardly beyond said flange means on said base means, and said skirt portion having mating correspondingly configured groove portions slidably receiving said portions of said flange means and tiltably supporting said housing means on said base means.

22. The invention as defined in claim 21 and said skirt portion of said housing means having circumferentially spaced inwardly extending tab means located beneath said flange means and holding said housing means on said base means to allow the housing means to freely move on the base means without jamming when lateral forces tilting said housing means relative to said base means are exerted.

23. The invention as defined in claim 14 and wherein said holding means comprises a first shoulder formed along an outer edge of said pellet, a second shoulder formed on said housing means and being mounted in abutting engagement with said first shoulder, and additional shoulder means extending in overlapping relationship relative to one of the shoulders to fixedly secure said pellet relative to said housing means.

24. The invention as defined in claim 23 and wherein said additional shoulder means comprises a portion of said pellet extending outwardly into surface engagement with said housing means, said portion of said pellet terminating in an edge at the surface of said housing means, said edge having continuous permanent surface engagement with said housing means completely around said pellet.

25. The invention as defined in claim 14 and wherein said spring means includes a first spring mounted directly between said base means and said housing means, and a second spring mounted between said base means and said terminal support means.

26. The invention as defined in claim 25 and said second spring being formed by flat strips of conductive material having a plurality of reversely bent segments resiliently interconnected and providing said electrical conductor means.

27. In a temperature sensing device, a housing having a skirt portion and an inwardly extending top portion having a terminal edge defining a central opening, a sensing pellet fixedly mounted in said central opening and having a sensing wire sandwiched between upper and lower plate means, and a groove formed in said pellet in said upper plate means and fixedly receiving the terminal edge of said top portion whereby said sensing pellet is fixedly secured to said housing in said opening.

28. The invention as defined in claim 27 and said sensing wire being located below the plane of said top portion.

29. The invention as defined in claim 28 and wherein the ends of said sensing wire extend outwardly parallel to said plate means toward said skirt portion beneath said top portion, the terminal edge of said top portion extending inwardly beyond the terminal edges of the plate means.

30. In a temperature sensing device, a pellet having a sensing wire sandwiched between substantially parallel plate means, portions of said sensing wire extending outwardly from said pellet substantially parallelly to said parallel plate means, fixed support means connected to said pellet, terminal means mounted on said support means and at least a portion of said terminal means being flat and extending in a plane substantially parallel to said plate means, and the ends of said sensing wire being parallel to the flat portion of said terminal means and extending to said terminal means and being fixedly connected thereto in substantially parallel surface to surface engagement therewith.

31. In a temperature sensing device, a pellet having a sensing wire, a terminal support means fixed to said pellet, conductor means formed from flat ribbon like material having a rectangular cross sectional configuration for connecting said sensing wire associated therewith to a remotely located control device, and spring clip terminal means integrally formed on the end portion of said conductor means, said spring clip terminal means being resiliently mounted on said terminal support means and fixedly electrically connected to said sensing wire.

32. The invention as defined in claim 31 and wherein said conductor means further comprise a plurality of flat linearly extending spring portions, adjacent spring portions being reversely bent and interconnected by relatively short curvilinear portions, and each of said spring portions being inclined relative to adjacent spring portions.

(References on following page)

References Cited by the Examiner

UNITED STATES PATENTS

| | | | |
|---|---|---|---|
| 1,041,293 | 10/1912 | Kelly | 29—155.57 |
| 1,956,826 | 5/1934 | Engholm | 29—155.57 |
| 2,484,585 | 10/1949 | Quinn | 338—25 |
| 2,567,756 | 9/1951 | Amsler | 73—362 |
| 2,699,487 | 1/1955 | Turner | 219—450 |
| 2,703,833 | 3/1955 | Vanvor | 338—28 |
| 2,728,832 | 12/1955 | Hoffman | 73—362 |
| 2,820,129 | 1/1958 | Long et al. | 219—516 X |
| 2,934,957 | 5/1960 | Reinhart et al. | 219—37.01 |
| 2,980,875 | 4/1961 | Sivacek | 338—25 |
| 3,037,179 | 5/1962 | Otto | 338—28 |
| 3,042,783 | 7/1962 | Mertler | 338—25 X |
| 3,088,016 | 4/1963 | Mertler et al. | 338—25 X |
| 3,153,139 | 10/1964 | Sivacek | 219—450 |

RICHARD M. WOOD, *Primary Examiner.*

ISAAC LISANN, *Examiner.*

C. ELLS, H. T. POWELL, W. D. BROOKS,
*Assistant Examiners.*